United States Patent

[11] 3,564,129

[72] Inventor Peter William Blaxtan
Watton at Stone, England
[21] Appl. No. 689,115
[22] Filed Dec. 8, 1967
[45] Patented Feb. 16, 1971
[73] Assignee The Rank Organisation Limited
London, England
[32] Priority Dec. 8, 1966
[33] Great Britain
[31] 55120/1966

[54] NOISE LIMITING CIRCUIT USING SWITCHED FILTER
11 Claims, 3 Drawing Figs.

[52] U.S. Cl. ........................................ 178/6; 333/17
[51] Int. Cl. ........................................ H03g 5/18, H04n 5/08, H04n 5/21
[50] Field of Search ........................................ 178/6 (F), (BWR), 6 (VBW)

[56] References Cited
UNITED STATES PATENTS

| | | | |
|---|---|---|---|
| 2,717,931 | 9/1955 | Duke .......................... | 179/171 |
| 2,904,642 | 9/1959 | Quinlan ....................... | 179/171 |
| 3,288,930 | 11/1966 | Johnson ....................... | 179/1 |
| 3,352,969 | 11/1967 | Konings ....................... | 178/7.1 |

*Primary Examiner*—Richard Murray
*Assistant Examiner*—Howard W. Britton
*Attorney*—Griffin, Branigan and Kindness

ABSTRACT: An electrical noise limiting circuit for use in an apparatus producing a composite signal including an information carrying signal of a selected bandwidth including a train of recurrent pulses. The circuit includes a switch responsive to the pulses in the composite signal, and a filter selectively connected to the apparatus by the switch. The filter reduces the level of the noise component in the composite signal at least during the periods of one or more of the pulses.

PATENTED FEB 16 1971 3,564,129

NOISE LIMITING CIRCUIT USING SWITCHED FILTER

Figure 1:
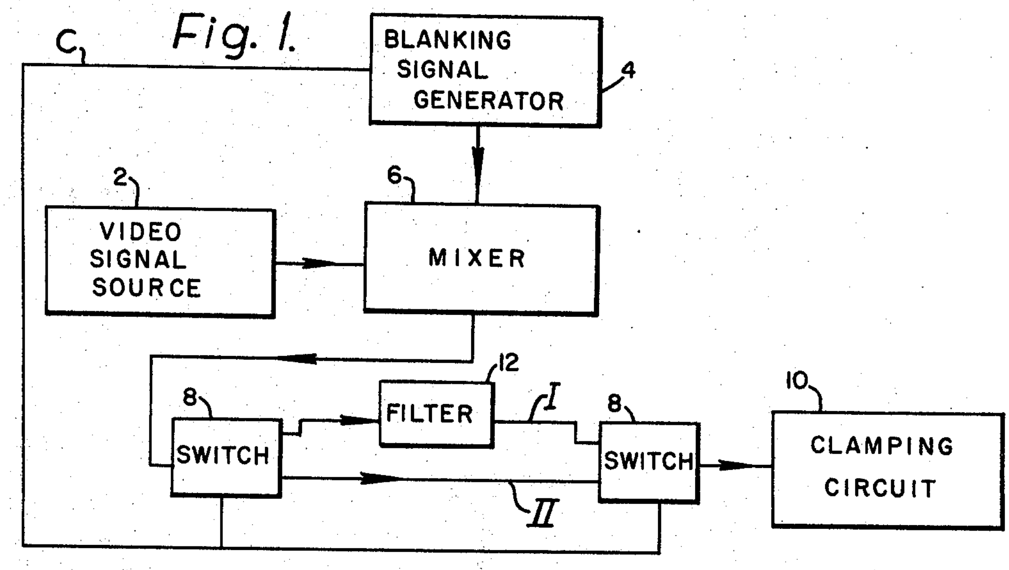

This invention relates to noise limiting circuit arrangements suitable for use in television receiving or television transmitting apparatus and effective to produce a reduction in the noise level of an information-carrying composite signal in the apparatus.

In, for example, a television receiving or a television transmitting apparatus, the video signal includes a train of recurrent pulses which are related in time to the scanning process of the cathode ray display tube of the apparatus. These pulses, referred to as blanking pulses, which in transmitting apparatus originate in a central sync generator at line and frame frequency, are combined with the video signal to produce the composite signal and are utilized in the receiving apparatus to suppress the video signal and/or scanning device during the line or frame flyback periods. The signal level of the blanking pulses which generally represents the maximum black amplitude excursion or the maximum white amplitude excursion of the video signal, is used as a reference level in a subsequent clamping circuit effective to maintain the true DC component of the video signal or to restore the video signal to this true DC level in the event of drift due to AC coupling or DC drift in previous circuits.

The performance of such a clamping circuit which is operative during the blanking periods is deleteriously effected by the presence in the composite video signal and particularly in the peak amplitude blanking periods of a noise signal component and attempts have hitherto been made to minimize the effects of such noise in the clamping circuit, by arranging the clamping circuit, to integrate the noise component over at least part of the available blanking period. Such means, however, do not provide a useful improvement in the case where the clamping circuit is unable to integrate over a sufficiently long period and it is an object of the present invention to produce a circuit arrangement in which the effect of noise, particularly on the clamping circuit, is reduced.

According to one aspect of the present invention, an electric noise limiting circuit arrangement for use in apparatus producing a composite signal consisting of an information carrying signal of a selected bandwidth including a train of recurrent pulses, comprises switching means responsive to the pulses in the composite signal together with filter means arranged to be selectively connected into the apparatus by way of the switching means and effective to reduce the level of the noise component in the composite signal at least during the periods of one or more of the pulses.

According to a further aspect of the present invention electric apparatus, particularly television receiving or transmitting apparatus, producing a composite information carrying signal of selected bandwidth including a train of recurrent pulses, includes a noise limiting circuit arrangement comprising switch means responsive to the pulses in the composite signal together with filter means arranged to be selectively connectable into the apparatus by way of switching means and being effective to reduce the noise level of the composite signal at least during the period of one or more of the pulses.

In the case where the information carrying signal is a composite video signal in television receiving or transmitting apparatus and includes a train of recurrent blanking pulses, the filter means are arranged to reduce the noise level by reducing the bandwidth of the video signal during the blanking periods. The bandwidth reduction may be effected between several lines of the scanning period of the apparatus or between one or more frames of this scanning period and is completed before the composite signal is applied to a clamping circuit effective to stabilize the DC level of the video signal at a selected level.

Since the noise level of a typical signal is proportional to the bandwidth of the signal, this method of noise reduction of the video signal has the advantage of reducing the noise level only during the blanking period in which the clamping circuit is operative and leaving the remaining part of the composite signal carrying the vision information, and thereby the quality of the picture reproduced from this signal undisturbed.

Figure 1A:
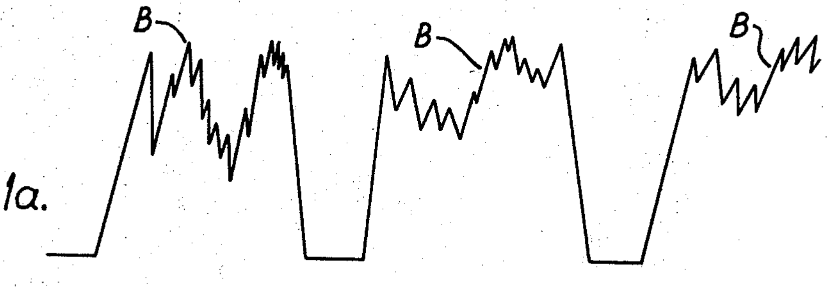

Embodiments of the invention will now be particularly described by way of example with reference to the accompanying drawings, in which:

FIG. 1 is a block circuit diagram of a part of a television film scanner and including a noise reducing circuit arrangement according to the present invention;

FIG. 1*a* is a representative waveform; and

Figure 2:
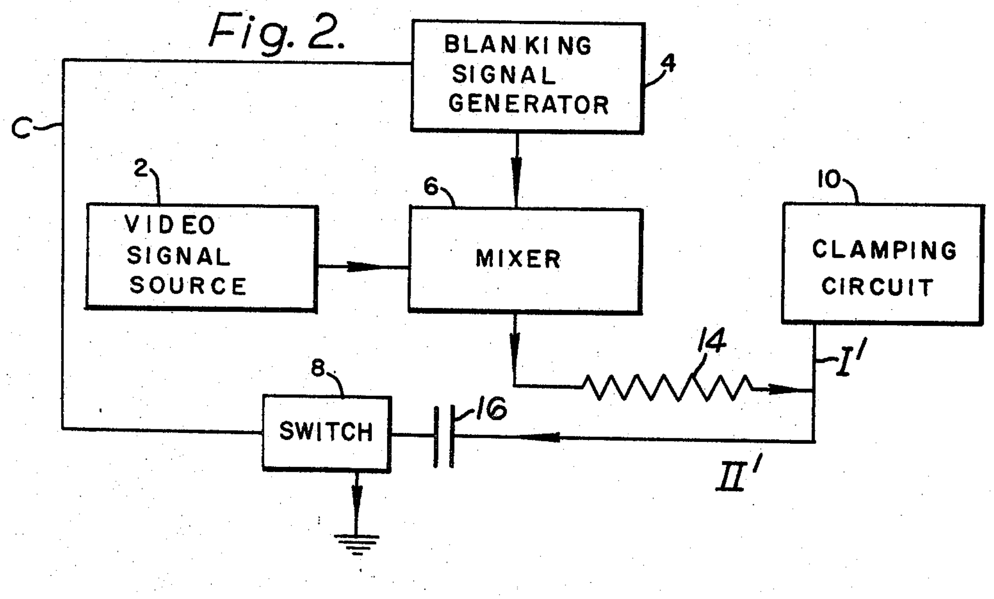

FIG. 2 is a schematic circuit diagram of a noise reducing circuit arrangement which is an alternative to that shown in FIG. 1.

Referring firstly to FIG. 1, this shows in block diagram form, a portion of a television film scanner or a television camera. In for example a television film scanner, the video signal generated in circuits well known in the art and indicated generally at 2, is combined in a mixer 6 with blanking signals generated at line and frame frequencies in a generator indicated generally at 4.

The output of the mixer 6 which comprises a composite signal of the waveform indicated generally in FIG. 1*a* is applied to the input of a two-gang electronic switch 8 which is effective in each of two alternative operating positions, respectively to channel the composite video signal into two alternative signal paths indicated generally at I and II. The electronic switch 8 is arranged to be responsive to the blanking signal portions, indicated at B of FIG. 1*a*, of the composite signal and is effective to channel the composite signal along path I only during the blanking periods and through the path II during the remaining periods. In this embodiment, the switch 8 is arranged to receive the operating blanking pulses directly from the generator 4 by way of control loop C.

In path II the composite signal is applied directly to a clamping circuit 10 of any type well known in the art and effective to clamp the video signal to a maximum black or white or any other suitable level.

The operation of such a clamping circuit which is operative during the blanking periods, is deleteriously effected by noise in the blanking portions of the composite signal and under these conditions produces an output signal which may be considerably distorted.

In order to minimize such signal distortion in the clamping circuit due to noise, the composite signal from the mixer 6 is channeled through path I only during the blanking periods. Path I includes a filter network 12 effective to reduce the bandwidth of the composite signal and will accordingly reduce the bandwidth only during the blanking periods. Since the noise level is a signal is a function of the signal bandwidth, the bandwidth reduction of the composite signal produced during the blanking periods only, significantly improves the performance of the clamping circuit without in any way correspondingly reducing the bandwidth of the remaining parts of the composite signal and thereby in the picture quality reproduced from this signal.

An alternative embodiment of the invention is shown in FIG. 2 in which like parts have like reference numerals. In FIG. a single gang electronic switch 8 responsive to the blanking pulse in the composite signal is respectively arranged to channel the composite signal only along path I′ and to the clamping circuit 10 in the absence of a blanking pulse and to include a shunt path II′ into path I′ during the blanking periods. Path I′ includes a source impedance 14 and path II′ includes a shunt capacitor 16.

Accordingly during the blanking periods, the source impedance 14 and the capacitor 16 integrates the noise in the composite signal and thereby reduces the level thereof entering the clamping circuit during the periods when the clamping circuit is operative.

The performance of the clamping circuit accordingly is improved.

I claim:

1. An electric noise limiting circuit arrangement for use in apparatus producing a composite signal comprising an information-carrying signal of selected bandwidth and a train of recurrent pulses, comprising: switching means having a control terminal connected to receive only said train of recurrent pulses, said switching means operating only in first or second alternative conditions and being responsive to initial transition of a said pulse to switch from said first to said second condition and responsive to terminal transition of a said pulse to switch back to said first condition, and filter means brought into operative connection by the switching means only for the duration of said second condition and effective to reduce the level of noise component in the composite signal during each pulse of said recurrent train.

2. A circuit arrangement as claimed in claim 1, wherein the filter means are effective to reduce the bandwidth of the composite signal.

3. A circuit arrangement as claimed in claim 1, wherein the composite signal is a television video signal and the pulses are blanking pulses.

4. A circuit arrangement as claimed in claim 3 wherein the filter means are arranged to reduce the bandwidth of the video signal.

5. A circuit arrangement as claimed in claim 4 wherein the filter means are connected in series relation with the video signal.

6. A circuit arrangement as claimed in claim 4, wherein the filter means are connected in shunt relation with the video signal.

7. A circuit arrangement as claimed in claim 6, wherein the filter means comprise a capacitor.

8. A circuit arrangement as claimed in claim 1, wherein the switch means are electronic switch means.

9. A circuit arrangement as claimed in claim 8, wherein the electronic switch means comprises two switches respectively providing two circuit paths from a common input and providing a common output from the two circuit paths.

10. A circuit arrangement as claimed in claim 9, wherein the filter means are inserted in one of the circuit paths.

11. A circuit arrangement as claimed in claim 8, wherein the electronic switch means is a single switch and selectively provides a single shunt path to the video signal.